Oct. 26, 1943.                W. KRÄMER ET AL                    2,333,015
                         VARIABLE REACTANCE DEVICE
                          Filed Feb. 3, 1941                2 Sheets-Sheet 1
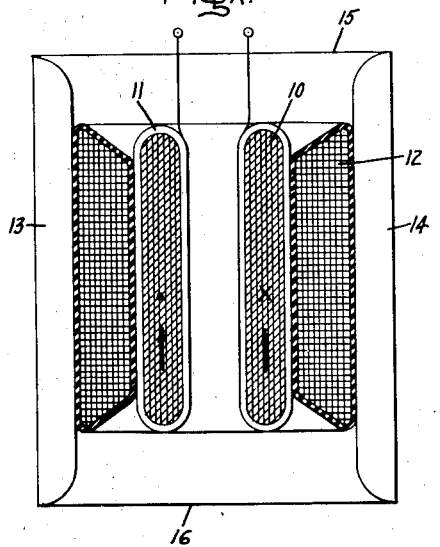
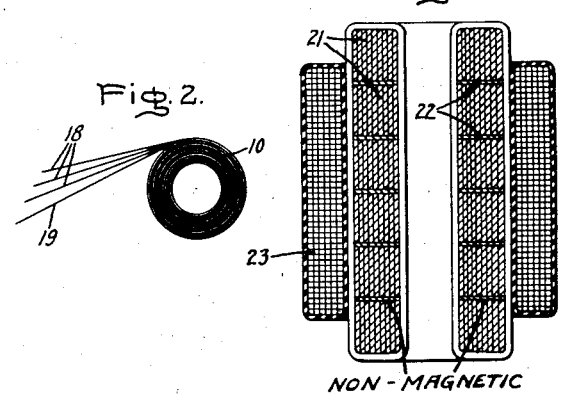
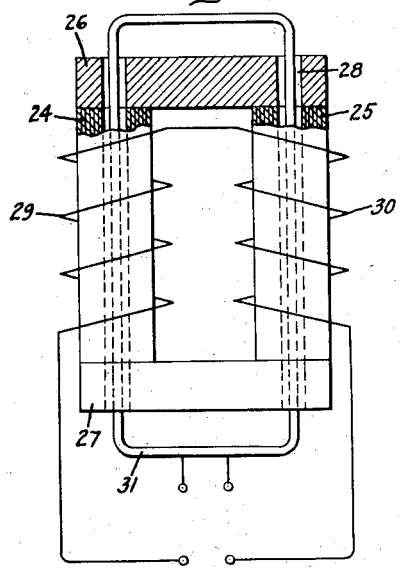
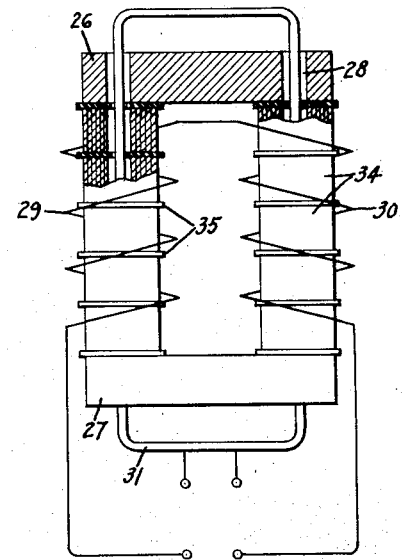
Inventors:
Werner Krämer,
Wilhelm Köchling,
by Harry E. Dunham
   Their Attorney.

Oct. 26, 1943.   W. KRÄMER ET AL   2,333,015
VARIABLE REACTANCE DEVICE
Filed Feb. 3, 1941   2 Sheets-Sheet 2
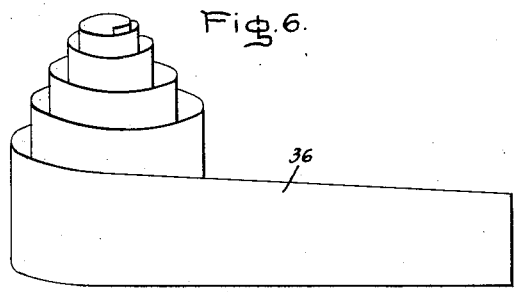
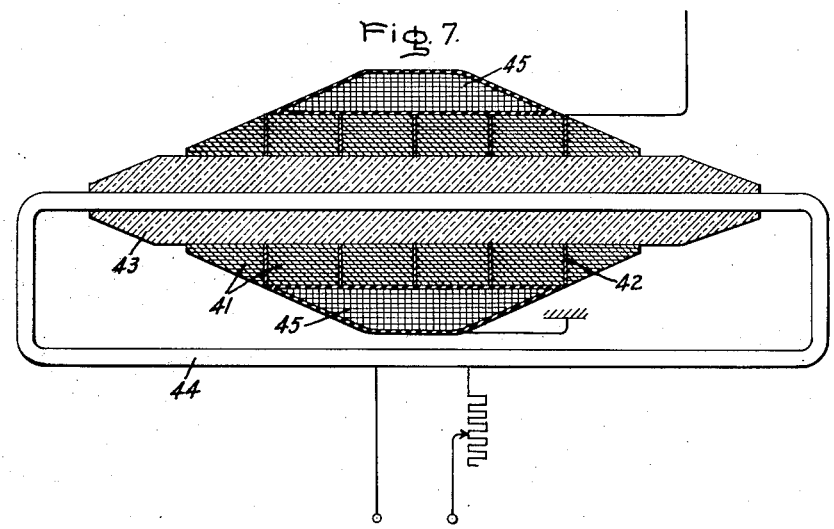
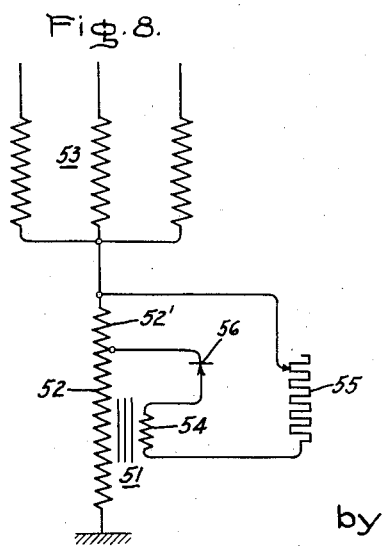
Inventors:
Werner Krämer,
Wilhelm Köchling,
by Harry E. Dunham
Their Attorney.

Patented Oct. 26, 1943

2,333,015

UNITED STATES PATENT OFFICE 2,333,015

VARIABLE REACTANCE DEVICE

Werner Krämer, Berlin-Karlshorst, and Wilhelm Köchling, Berlin-Lubars, Germany, assignors to General Electric Company, a corporation of New York Application February 3, 1941, Serial No. 377,260
In Germany November 28, 1939

9 Claims. (Cl. 171—242)

The present invention relates to variable reactance devices and more particularly to reactors of the type having a magnetic core wound with one or more coils connected in series with a load or translating device in an alternating current circuit and an auxiliary, separately energized, exciting coil for controlling the magnetic density in the core.

In the usual reactor of this type, the core structure is built up of stacks of punched laminations and generally comprises two subunits balanced against each other with the main and auxiliary windings so arranged thereon as to neutralize the voltages induced in the auxiliary winding by the flux of the main winding. As distinguished from such devices, the present invention has for a general object the provision of a reactor in which the windings are arranged upon a unitary core structure in such a manner as to be substantially mutually noninductive. A reactor constructed in accordance with the present invention, therefore, comprises a relatively few number of parts, and is relatively compact in design.

A more specific object of the present invention is to provide a new and improved variable reactance device of a simplified design in which the mean flux density in the core is controlled by a flux flowing through the core structure transversely as regards the direction of the main core flux.

A still further object of the invention is to provide a variable reactance device having a magnetic core structure with a main alternating current winding and an auxiliary control winding so arranged thereon that the control winding may be energized with either direct or alternating current.

In accordance with one embodiment of the invention, the core structure includes a hollow cylindrical core member through which is threaded one side of an auxiliary control winding, while the main alternating current winding is arranged coaxially around the core member, and hence its turns extend at right angles with respect to the turns of the auxiliary winding. The premagnetizing flux created by the auxiliary winding therefor flows through the core member at right angles with respect to the flux produced by the main winding, and hence the two windings are substantially mutually noninductive. The control winding may be energized from either a direct or suitable alternating current source of supply to vary the reactance of the device as regards the current or voltage of the main alternating current circuit.

For a more complete understanding of the invention, attention is directed to the following description taken in connection with the accompanying drawings while its scope will be pointed out with greater particularity in the claims.

In the drawings, Fig. 1 is a cross-sectional view of a variable reactance device constructed in accordance with the present invention; Fig. 2 is a cross-sectional view illustrating the construction of a core member embodied in the device of Fig. 1; Figs. 3, 4, 5, and 6 are views illustrating additional modifications of the invention; Fig. 7 is an explanatory view illustrating the construction of one detail of the invention; and Fig. 8 is a protective arrangement embodying the reactance device of the invention.

The variable reactance device illustrated in Fig. 1 comprises a tubular or hollow cylindrical magnetic core member 10 which is wound with an auxiliary exciting winding 11 having its turns threaded through the hollow core member, and a main alternating current winding 12 arranged coaxially around the core member 10 over the winding 11. Since the coil planes are at right angles with respect to each other, the magnetic fluxes created by the two coils will also be at right angles with respect to each other. The flux created by the auxiliary control winding will flow through the core member 10 in planes at right angles with respect to the axis of the core member or in the direction indicated by the arrow heads and tails, while the flux created by the main alternating current winding 12 will flow longitudinally through the core member 10 parallel with the axis thereof in the direction indicated by the line arrows. With such arrangement of the coils there will be substantially no mutual inductance therebetween, and furthermore, the control winding 11 may be energized from either a direct current or suitable alternating current source of supply. If connected to an alternating current source, the wave shape of the current and voltage in the main winding circuit may be somewhat distorted as a result thereof but in certain applications this is not objectionable.

While the paths of the flux produced by the control winding are restricted to the cylindrical core, the path for the flux of the main winding is formed only in part by this core member and in the arrangement of Fig. 1 a magnetic return path for this flux is provided by a pair of outer core legs 13 and 14 which are joined together by yokes 15 and 16 extending over the opposite ends of the cylindrical core member 10 and secured thereto by any suitable insulating means (not shown).

The core member 10 is preferably of the wound type, that is, one or more relatively long strips of magnetic material are wound upon a suitable mandrel to form a cylinder of the desired thickness. Since a potential will be induced in the turns of the core member 10 by the main winding, the turns of magnetic material are suitably insulated from each other either by a layer of insulation applied to one side of the magnetic strip, or, as illustrated in Fig. 2, by winding a plurality of strips 18 of magnetic material with an additional strip 19 of suitable insulating material. Because of the voltage induced in the core member 10, it should be electrically insulated from the remainder of the magnetic structure particularly if the remainder is to be grounded.

In the modification illustrated in Fig. 3, the cylindrical core member comprises a plurality of relatively short cylindrical sections 21 which are arranged in an end to end relation with nonmagnetic spacers 22 arranged therebetween. These spacers provide gaps in the magnetic circuit for the main winding 23 to provide desired linear reactance characteristics for the device without in any way affecting the low reluctance of the magnetic circuit for the control winding.

In the modification illustrated in Fig. 4, the magnetic structure includes two similar hollow cylindrical core members 24, 25 connected together at the opposite ends by yokes 26 and 27 having openings 28 in alignment with the openings through the core members 24 and 25. Arranged coaxially upon the core members 24 and 25 is a pair of main alternating current winding coils 29 and 30, which may be connected together in series. A single auxiliary winding 31 is threaded through the openings in the two core members 24 and 25 and the aligned openings in the yokes for magnetizing both core members. The modification illustrated in Fig. 5 is similar to that of Fig. 4 except that the cylindrical core members are divided into a plurality of relatively short cylindrical sections 34 and separated by nonmagnetic spacers 35 for increasing the reluctance of the magnetic circuit for the main winding 29, 30. The spacers 35 may be of insulating material and have openings therethrough of a diameter smaller than the diameter through the tubular sections 34 so that the turns of winding 31 threaded through the sections will be spaced and further insulated therefrom.

The reactor devices described are particularly suitable for connection in a ground lead of a power system for the suppression of ground current flow as during accidental arcs to ground along the line. In Fig. 8, an inductance device 51 according to the invention is shown having its alternating current winding 52 connected at one end to the neutral of a transformer bank 53 and at its other end to ground. The auxiliary or magnetizing coil 54 may be energized from any suitable source of power whereupon the cross magnetization flux produced thereby will determine the alternating current flow through the reactor winding 52. As illustrated, the winding 54 may be connected across a portion 52' of the alternating current winding 52 through a contact rectifier 56 for direct current excitation, though it is obvious that the winding portion 52' represents any suitable form of potential transformer. With the auxiliary winding excitation thus controlled by the ground current, it is not necessary to supply continuously the power for premagnetization. For control purposes, a suitable variable resistor 55 such as a carbon pile unit may be provided in the circuit of winding 54. In the arrangement as shown it will be seen that the value of direct current excitation for the winding 54 is automatically regulated by resonance to suppress arcs to ground.

Since relatively high voltages may be induced in the hollow cylindrical core members by the main winding threaded therethrough, it is desirable that the ends of such core members be rounded to minimize the formation of corona thereon. Cores with rounded ends as shown in Fig. 1 may be readily formed by first suitably tapering the opposite ends of the metal strips before they are wound into the core. A conical shape for the ends of the core cylinders may also be advantageous and which may be readily provided by winding the core, or the end sections when the core member consists of a plurality of sections, by winding a metal strip 36 of a progressively decreasing width as illustrated in Fig. 6.

The reactance device illustrated in Fig. 7 comprises a cylindrical core member made up of a plurality of relatively short sections 41 separated by nonmagnetic spacers 42, the end sections of which are tapered in a manner as illustrated by Fig. 7. The core sections are arranged coaxially in an end to end relation upon an insulating cylinder 43 which may be of ceramic material, and through which are threaded the turns of the auxiliary control winding 44. Surrounding the magnetic core is a main alternating current winding 45. A return magnetic circuit for the flux produced by the main winding may be provided, if desired, in a manner as indicated in Fig. 1.

Having described the principle of our invention in what we now consider to represent the preferred embodiments thereof, we desire to have it understood that the specific arrangements shown are merely illustrative and that the invention may be carried out by other means.

What we consider new and desire to secure by Letters Patent of the United States is:

1. A reactance device comprising a hollow cylindrical magnetic core having a main alternating current winding arranged coaxially therearound and an auxiliary winding arranged in a substantially non-inductive relation with respect to said main winding and in an electrical circuit independent of that of said main winding for magnetizing said core at right angles with respect to the flux created by said main winding.

2. A reactance device comprising a hollow cylindrical core, said core being formed of a magnetic strip wound with insulation between consecutive turns, a main alternating current winding arranged coaxially on said core, a control winding having one side extending through said core member and arranged in a substantially non-inductive relation with respect to said main winding and in an electrical circuit independent of that of said main winding whereby said core member is magnetized at right angles with respect to the direction of flux created by said main winding.

3. A reactance device comprising a tubular magnetic core member, a first winding arranged substantially coaxially around said member, a second winding having turns threaded through said core member, and magnetic means connecting the opposite ends of said core member.

4. A reactance device comprising a pair of magnetic core members, yoke members connecting the corresponding ends of said core members, a first winding arranged coaxially around said core members, said core members comprising a plurality of wound cylindrical sections arranged in an end to end relation, nonmagnetic members arranged between said sections, said sections having axial openings, and a second winding threaded through said openings.

5. A reactance device comprising a magnetic core, a first winding arranged coaxially around said core, said core comprising a plurality of tubular sections arranged in an end to end relation, a second winding having turns threaded through said core sections, means including insulating spacers between said sections for spacing said turns of said second winding from the inner surfaces of said core sections.

6. A reactance device comprising a pair of hollow cylindrical core members, yoke members connecting the corresponding ends of said core members, a main winding having portions arranged coaxially around said core members, and a control winding having turns threaded through the axial openings in said core members.

7. A reactance device comprising a pair of hollow cylindrical core members, a main winding arranged around said core members, yoke members connecting the adjacent ends of said core members and having openings in alignment with the openings in said core members, and a control winding threaded through the openings of both of said core members.

8. A variable reactance arrangement comprising a magnetic core, a main alternating current winding arranged coaxially on said core, a control winding arranged on said core at right angles with respect to said main winding, means for exciting said control winding in accordance with the current flow through said main winding and a variable resistor in the excitation circuit of said control winding.

9. A reactance device comprising a pair of hollow cylindrical magnetic core members, yoke members connecting the corresponding ends of said core members, a first winding arranged around said core members, and a second winding having a turn threaded through said hollow core members for magnetizing said core members at right angles with respect to the flux created by said main winding.

WERNER KRÄMER.
WILHELM KÖCHLING.